(12) United States Patent
Mason

(10) Patent No.: US 9,535,759 B2
(45) Date of Patent: Jan. 3, 2017

(54) WORK QUEUE THREAD BALANCING

(71) Applicant: W. Anthony Mason, Vancouver, CA (US)

(72) Inventor: W. Anthony Mason, Vancouver, CA (US)

(73) Assignee: OSR Open Systems Resources, Inc., Amherst, NH (US)

( * ) Notice: Subject to any disclaimer, the term of this patent is extended or adjusted under 35 U.S.C. 154(b) by 0 days.

(21) Appl. No.: 14/286,694

(22) Filed: May 23, 2014

(65) Prior Publication Data

US 2015/0339168 A1    Nov. 26, 2015

(51) Int. Cl.
*G06F 9/46*    (2006.01)
*G06F 9/50*    (2006.01)

(52) U.S. Cl.
CPC ............. *G06F 9/5027* (2013.01); *G06F 9/50* (2013.01)

(58) Field of Classification Search
None
See application file for complete search history.

(56) References Cited

U.S. PATENT DOCUMENTS

| 6,075,939 | A * | 6/2000 | Bunnell et al. ............. 717/107 |
| 6,687,729 | B1 * | 2/2004 | Sievert .................. G06F 9/4843 718/100 |
| 7,634,542 | B1 * | 12/2009 | Krause et al. .............. 709/206 |
| 8,566,833 | B1 * | 10/2013 | Biswas et al. .............. 718/104 |
| 2002/0120717 | A1 * | 8/2002 | Giotta ........................ 709/219 |
| 2007/0136311 | A1 * | 6/2007 | Kasten et al. ............... 707/10 |
| 2008/0178188 | A1 * | 7/2008 | Cooke et al. .............. 718/104 |
| 2010/0083272 | A1 | 4/2010 | Hellerstein et al. |
| 2011/0161976 | A1 * | 6/2011 | Alexander ........... G06F 9/5066 718/104 |

OTHER PUBLICATIONS

"Configuring WebLogic Server Environments," BEA Systems, 2014, downloaded from http://docs.oracle.com/cd/E11035_01/wls100/config_wls/self_tuned.html on May 23, 2014.

* cited by examiner

*Primary Examiner* — H S Sough
*Assistant Examiner* — William C Wood
(74) *Attorney, Agent, or Firm* — K&L Gates LLP

(57) ABSTRACT

Various embodiments are directed to systems and methods for work queue thread balancing. A global thread pool manager may be configured to receive a request to add a work item to a constituent work queue. The constituent work queue may be described by a work queue thread property. The global thread pool manager may add the work item to the constituent work queue and match the work item to a global thread selected from a global thread pool. The global thread may be configured according to the work queue thread property to generate a configured global thread. The configured global thread may execute the work item.

18 Claims, 13 Drawing Sheets

WORK QUEUE THREAD BALANCING

BACKGROUND

Work queues are utilized by many modern operating systems to manage asynchronous processing tasks. When an application or other system component discovers a processing task, e.g., a work item, that does not need to be completed immediately, it places the work item on a work queue. The work queue typically has one or more dedicated threads. A thread is a unit of software that can be executed by a processor or processor core. A different component manages the execution of the work queue threads, as well as other threads. When executed, the work queue threads pull items from the work queue and execute them, often according to a first in-first out (FIFO) arrangement. In this way, work items that are not time sensitive or that benefit from "batch" processing can be queued and performed when the computer has available processing resources. Examples of work items that are often queued include interrupt processing, input/output (I/O) requests, garbage collection, etc.

Many systems support both platform work queues and user work queues. Platform work queues are typically managed by the operating system and are made available to a wide range of applications and/or other system components. User work queues are created by applications and are used by a limited set of system components. User work queues are often used to avoid race and deadlock conditions that can occur with platform work queues or existing user work queues. For example, when a work item (A) requires a result of another work item (B) to complete its processing task, the work item (A) cannot be completed until after the work item (B) is completed. If the work item (A) begins to execute before the work item (B) is completed, the thread executing the work item (A) will go into a wait state. If there are not sufficient dedicated threads to process the work item (B), then the thread executing the work item (A) will remain it its wait state indefinitely, which is referred to as a deadlock condition. In another example, a work item (X) may be coded to assume that another work item (Y) has already executed and made particular changes to system data. If the work item (X) is executed before the work item (Y), system data may not be in the state expected by work item (X), resulting in a race condition.

User work queues give software developers additional control to prevent race and deadlock conditions. At the same time, however, each work queue consumes system resources. For example, each active thread for a work queue utilizes physical memory space that is either filled or reserved for the thread. As more and more work queues are used, more resources are consumed. Thus, while individual applications may be optimized overall system performance suffers.

DRAWINGS

Various embodiments are described herein by way of example in conjunction with the following figures, wherein.

DESCRIPTION

Figure 1:
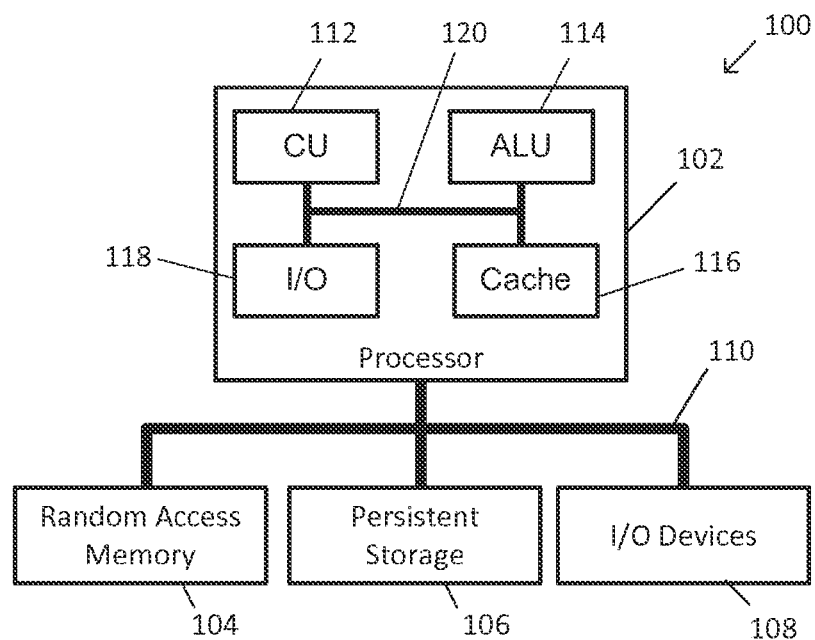
FIG. 1 is a block diagram showing one embodiment of a hardware architecture for an example computer system that may be used, as described herein, to implement work queue thread balancing.

Various embodiments described herein are directed to systems and methods for implementing, in a computer system, a global thread pool comprising global threads for servicing multiple constituent work queues. Each constituent work queue may be described by a set of constituent work queue properties. The constituent work queue properties may include thread properties that describe how threads executing work items from the work queue should be configured by default. Examples of thread properties include, process context, security context, priority, processor affinity, Non-Uniform Memory Access (NUMA) affinity, interrupt priority, etc. When a global thread executes a work item from a constituent work queue, it may assume the thread properties of the constituent work queue. Constituent work queue properties may also include general properties such as, for example, whether the work queue has a dedicated thread pool, maximum and/or minimum numbers of dedicated threads in the dedicated thread pool, a maximum queue depth, a maximum work item wait time, a maximum idle time for dedicated threads, etc.

In various embodiments, a system component may queue a work item at a constituent work queue that is serviced by the global thread pool, for example, by creating an entry for the work item at the constituent work queue. The constituent work queue entry may comprise, for example, a pointer or other reference to computer program instructions that may be executed by a thread to process the work item and data to be used by the computer program instructions. The work item may then be matched to a global thread that will execute the work item. The identified global thread is then configured according to the properties of the constituent work queue. For example, the global thread may be switched to a process context indicated by the constituent work queue properties. After the global thread is configured, the configured global thread executes the work item. Upon completing the work item, the global thread may be ready for matching to another work item from the constituent work queue or another constituent work queue.

Matching global threads to constituent work queue items may be performed in any suitable manner. In some embodiments, a global work queue may be used. The global work queue may comprise a plurality of entries, where each entry includes a reference to a corresponding entry on a constituent work queue. For example, when a work item is added to a constituent work queue, a constituent work queue entry for the work item may be generated at the constituent work queue. In addition, a global work queue entry may be generated for the work item at the global work queue. The global work queue entry may comprise a reference to the work item and a reference to the work item's corresponding constituent work queue. For example, both references may be accomplished by including at the global work queue entry a reference (e.g., a pointer) to the constituent work queue entry at the constituent work queue for the work item. Global threads from the global thread pool may execute work items from the global work queue. When a global thread is available to execute a work item, it may select the next entry from the global work queue (e.g., the entry at the front of the global work queue). As described, the next entry may indicate a work item and a constituent work queue. The global thread may be configured according to the properties of the constituent work queue and then execute the work item.

Before providing additional description of systems and methods for work queue thread balancing, brief descriptions are provided of an example computer system for implementing work queue thread balancing. FIG. 1 is a block diagram showing one embodiment of a hardware architecture for an example computer system 100 that may be used, as described herein, to implement work queue thread balancing. The computer system 100 comprises a processor 102, a random access memory or RAM 104, persistent storage 106, and various input/output (I/O) devices 108. The various components 102, 104, 106, 108 may be in communication with one another via one or more system-level buses 110.

Persistent storage 106 is a data store that may be non-volatile, allowing data to be preserved when the computer system 100 is powered down. Persistent storage 106 may comprise any kind of storage drive or device capable of storing data in an electronic or other suitable computer-readable format. For example, persistent storage 106 may include a single fixed disk drive, an array of disk drives, an array of disk drives combined to provide the appearance of a larger, single disk drive, a solid state drive (SSD), etc. Persistent storage 106 may be physically located at the same location as the remainder of the computer system 100 and/or may be accessible over a network. In some embodiments, persistent storage 106 may comprise more than one physical device located at a single location or across multiple locations. For example, in some embodiments, the persistent storage 106 may be and/or comprise cloud-based storage.

The RAM 104 is a data store that is quickly accessible to the processor 102. For example, the RAM 104 may have an access time less than that of the persistent storage. The RAM 104 may comprise any suitable type of memory including, for example, Dynamic Random Access Memory (DRAM), Double Data Rate Synchronous Dynamic Random Access Memory (DDR SDRAM), etc. I/O devices 108 comprise hardware that allows the computer system 100 to receive data from and provide data to users. For example, I/O devices 108 may comprise keyboards, mice, touch screens, displays, monitors, printers, hard disk drives, floppy disk drives, joysticks, image scanners, etc.

Generally, the processor 102 executes computer program instructions while interfacing with various other components of the computer system 100. For example, the processor 102 may receive computer program instructions and/or other data from the RAM 104, the persistent storage 106, and/or the I/O devices 108. The processor 102 executes the computer program instructions and writes resulting data to the RAM 104, the persistent storage 106 and/or the I/O devices 108.

The processor 102 comprises various components such as a control unit 112, an arithmetic and logic unit (ALU) 114, cache memory 116, and an input and output I/O control 118. These components may be generally referred to as the processor core. Accordingly, the processor 102 may be said to have a single core capable of executing a single thread at a time. The components 112, 114, 116, 118 may be interconnected by one or more processor busses 120, which may comprise groups of wires or traces. The control unit 112 (control system or central controller) may direct the various components of the processor 102. For example, the control unit 112 may decode each instruction in a computer program and turn it into a series of control signals that operate other components of the processor 102 or computer system 100. To enhance the performance or efficiency of operation, the control unit 112 may, in some embodiments, alter the order of instructions. In some embodiments, the control unit 112 includes a program counter and a memory register that tracks the location in memory (e.g., RAM 104 and/or cache memory 116) from which the next instruction is to be read.

The ALU 114 may be capable of performing arithmetic and logic operations, for example, as instructed by the control unit 112. The set of arithmetic and logic operations that a particular ALU 114 supports may vary, for example, based on design considerations. For example, some ALUs 114 support adding and subtracting only, while others support additional operations such as multiplying, dividing, square roots, and trigonometry functions (sine, cosine, etc.). Some ALUs may also support operations that compare numbers and return Boolean truth values (e.g., true or false). The ALU 114 may be configured to receive any suitable kind of operand. For example, some ALUs 114 may be configured to operate on whole numbers (integers), while others may use floating point representations of real numbers, for example. Some ALUs 114 may support operations on vectors and/or matrices. For example, graphics processors and computers with Simple Instruction Multiple Data (SIMD) and/or Multiple Instruction Multiple Data (MIMD) features often possess ALUs 114 that support vector and/or matrix operations.

The I/O control 118 may comprise hardware facilitating interaction between the processor 102 and various other components of the computer system 100 including the RAM 104, the persistent storage 106 and the I/O devices 108. Cache memory 116 is memory that typically has an access time less than that of the RAM 104 or persistent storage 108. For example, cache memory 116 may have a shorter access time because it is accessible to the other components of the processor 102 via the one or more processor busses 120 without the need to utilize the one or more system-level busses 110. Commonly accessed data may be stored at the cache memory 116 to avoid unnecessary calls to the RAM 104 and/or persistent storage 106. For example, data making up the context of a process or application may be stored at cache memory 116, as described herein.

Figure 2:
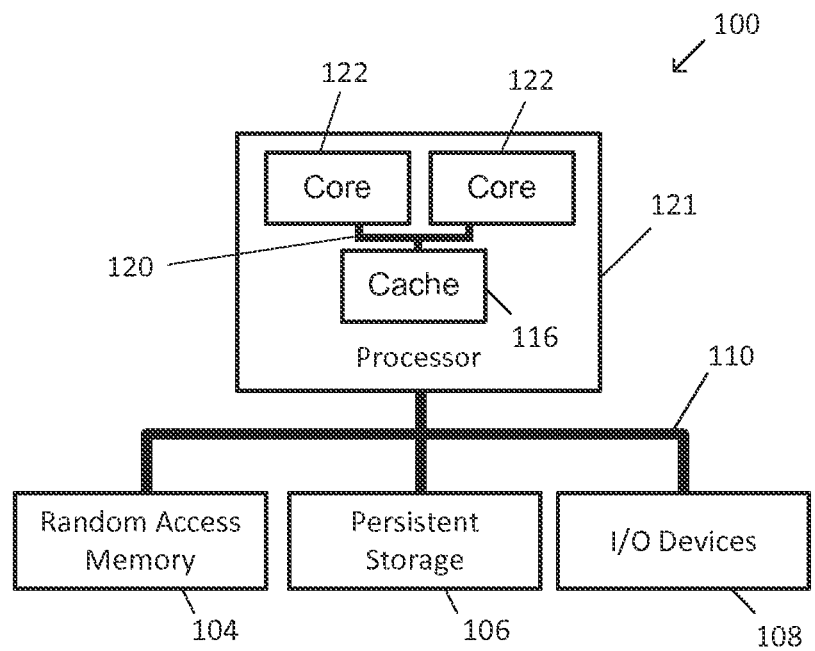
FIG. 2 shows one embodiment of the computer system of FIG. 1 comprising a processor that has two cores.

The processor 102 may be configured to execute one thread at a time. Some embodiments of the computer system 100, however, utilize configurations that allow execution of more than one thread at a time. For example, FIG. 2 is a block diagram showing one embodiment of the computer system 100 comprising a processor 121 that, in turn, comprises two cores 122. Each core 122 may be capable of executing a thread, allowing the processor 121 to execute more than one thread at the same time. Each core 122 may comprise distinct components such as, for example, a control unit, an ALU, an I/O control, etc. Cores 122 may have on-board cache memory (e.g., cache memory accessible only to the core 122) and/or may utilize common cache memory 116, for example, via the one or more processor busses 122. Although two cores 122 are shown in FIG. 2, the processor 121 may comprise any suitable number of cores 122.

Figure 3:
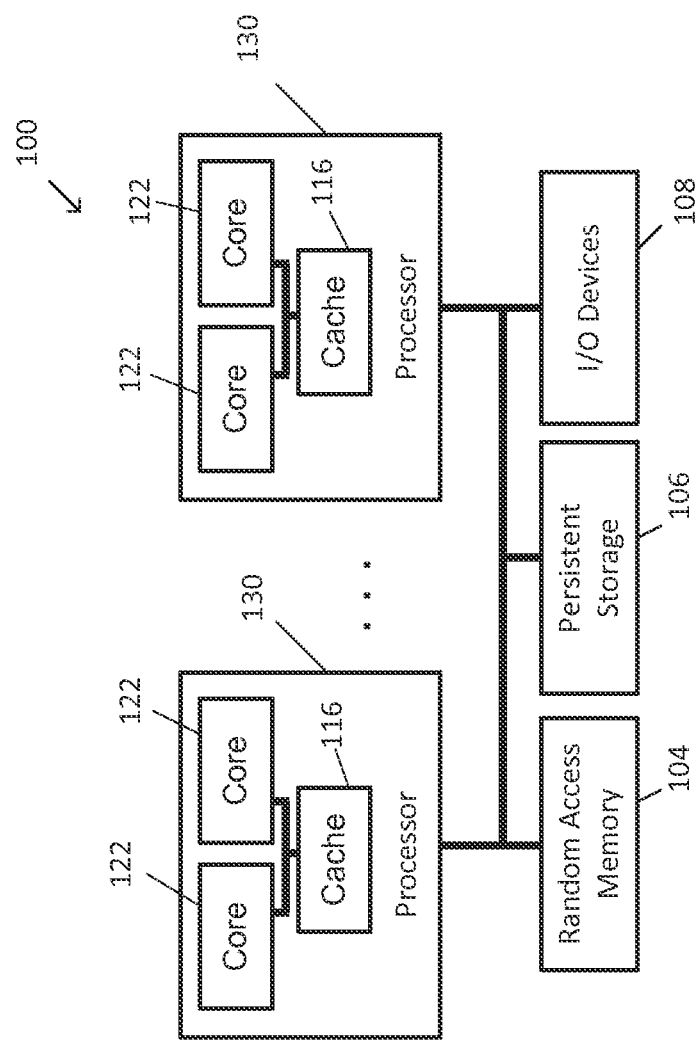
FIG. 3 is a block diagram showing one embodiment of the computer system of FIG. 1 comprising multiple processors.

In other embodiments, the computer system 100 may comprise multiple processors. FIG. 3 is a block diagram showing one embodiment of the computer system 100 comprising multiple processors 130. The processors 130 may have multiple cores 122, as shown, or a single core similar to the processor 102. In some embodiments of the computer system 100 having more than one core and/or more than one processor, access to memory is not uniform between different processors and cores. For example, some processors and/or cores may have dedicated memory that is not available to other processor or cores (e.g., cache or RAM). Also, some processors and/or cores may be positioned to access a particular portion of RAM or cache faster than other processors and/or cores. This may be due to physical proximity, or any other factor. Systems where different processors and/or cores have non-uniform access to memory may be called non-uniform memory access (NUMA) systems. In such systems, as described herein, it may be desirable to direct certain work items to threads that run on a processor core having a desired memory access configuration.

In some embodiments, each processor core is capable of executing one thread at a time. Some embodiments, however, may utilize a processor or processors with cores that can execute more than one thread simultaneously. Examples include processors available from the INTEL CORPORATION that utilize hyper-threading to allow each core in the processor to present to the operating system as multiple distinctly addressable logical cores. Each logical core, then, may execute different threads in a manner that is concurrent, or at least appears concurrent to the other components of the computer system 100. The total number of threads that may be concurrently executed by the computer system 100 may depend on the total number of processors cores in the system 100, including both physical and logical cores. For example, each processor core may be capable of executing one concurrent thread.

Figure 4:
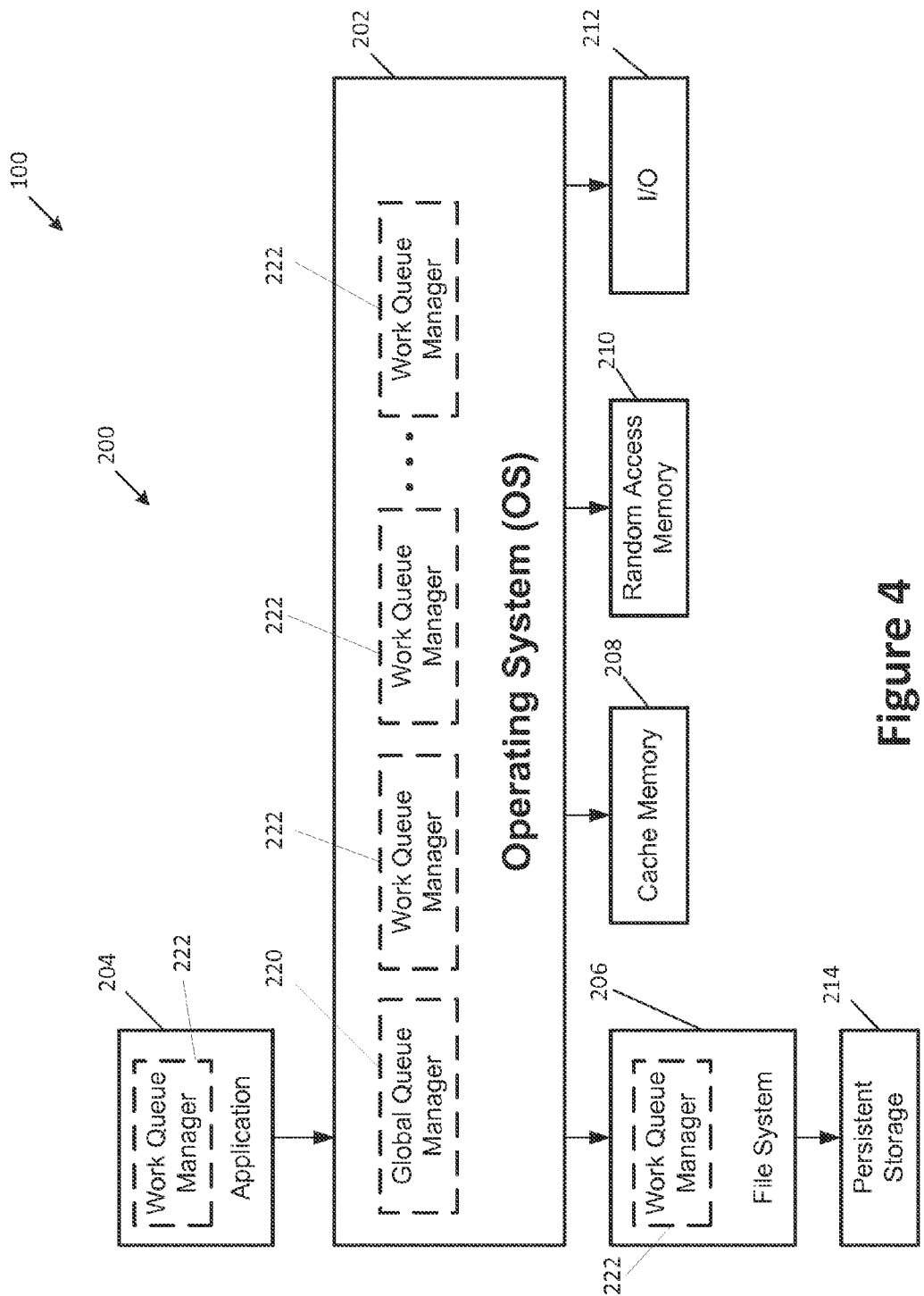
FIG. 4 is a block diagram showing one embodiment of a logical architecture of the computer system of FIGS. 1-3 that may be used, as described herein, to implement work queue thread balancing.

FIG. 4 is a block diagram showing one embodiment of a logical architecture 200 of the computer system 100 that may be used, as described herein, to implement work queue thread balancing. The architecture 200 may be implemented on any suitable type of computer hardware including, for example, the computer system 100 described herein. The architecture 200 may include one or more examples of an operating system or OS 202, an application 204, a file system 206, cache memory 208, random access memory (RAM) 210, various input/output (I/O) devices 212 and persistent data storage 214. In various embodiments, cache memory 208, RAM 210, I/O devices 212 and persistent storage 214 may comprise the corresponding hardware components described above with respect to the computer system 100.

The application 204 is executed by a processor or processors of the computer system 100. When executed, the application 204 may perform at least one function such as, for example, providing e-mail service, providing a virus protection or other security service, providing word processing, providing financial management services, performing administrative tasks for the computer system, etc. Although FIG. 4 shows a single application 204, the architecture 200 may support an arbitrary number of applications (not shown).

The OS 202 may manage the execution of the application 204 and its interactions with other components of the architecture 200. For example, the application 204 may be executed by one or more processes and/or threads managed by the OS 202. The OS 202 may schedule the execution of processes or threads at one or more processor cores of the computer system 100. The OS 202 may also provide services to the application 204 that facilitate the application's 102 functions. For example, the operating system 202 may allow the application 204 to access and manipulate system resources, including data stored at the RAM 210 or persistent storage 214. For example, the application 204 may direct data access requests to the OS 204. The OS 202 may handle the access requests, for example, by querying the appropriate system component and performing a read or write operation. The OS 202 may be and/or comprise any suitable operating system. For example, the OS 202 may be and/or comprise any version of MICROSOFT WINDOWS, any UNIX operating system, any Linux operating system, OS/2, any version of MAC OS, etc.

The OS 202 may access persistent storage 214 utilizing one or more file systems 206. The file system 206 may be an organization system for logically and physically organizing data present at the persistent data storage 214. In some embodiments, the file system 206 is a native file system included with the operating system 202 a third party file system. The file system 206 may organize data units into logical files and directories or folders. The file system 206 may also manage associations between data files, directories and physical addresses at the persistent data storage 214. The file system 206 may be, for example, specific to a computer system and/or or to particular drives making up data storage 108. In various embodiments, a single file system 206 may manage associations between data files, directories, and physical locations for all devices making up the persistent data storage 214. In other embodiments, some or all devices of the persistent data storage 214 may utilize dedicated file systems. The file system 206 may be any suitable file system including, as non-limiting examples, File Allocation Table 16 (FAT16), File Allocation Table 32 (FAT32), NTFS, High Performance File System (HPFS), UNIX file system (UFS), XFS, journaled file system (JFS), Universal Data Format File System (UDFS), CD-ROM File System (CDFS), Enhanced File System (EFS), SGI XFS, Clustered XFS (CXFS), HFS, VxFS, Raw File System (RawFS), Local File System (DCE/LFS), Resilient File System (ReFS), etc.

The architecture 200 may additionally comprise one or more global queue managers 220. The global queue manager 220 may manage a global thread pool and, in some examples, a set of constituent work queues serviced by the constituent work queues. The global queue manager 220 may also provide functionality that allows other components of the architecture 200 set up and use constituent work queues. For example the global queue manager 220 may provide functions that may be called by architecture components to create a work queue, set work queue properties (e.g., thread properties or general properties), add a work item to a work queue, delete a work item from a work queue, etc.

The global queue manager 220 may be implemented at any suitable logical position in the architecture 200. For example, the global queue manager 220 may be a service or other component executed by the OS 202 and provided to some or all of the components of the architecture 200. Also, for example, the global queue manager 220 may be executed by an application 204 or other architecture component to provide support for a global thread queue to other system components. In some embodiments, the global queue manager 220 is a plug-in to the OS 202. This configuration may be used, for example, when the OS 202 does not otherwise support a global thread pool. The global queue manager 220, then, may comprise one or more modules that are executed in the kernel address space of the OS 202. This may allow the global queue manager 220 to generate and/or access one or more dynamically linked libraries (.dlls) for defining function calls. The function calls for generating and/or managing constituent work queues may then be accessed by any component of the architecture 200 with suitable permission. For example, the OS 202 and/or the global queue manager 220 may implement a permissions scheme defining the applications 204 and other architecture components that are authorized to access the global queue manager 220. With a UNIX or Linux-based operating system, the global queue manager 220 may operate as a pseudodevice. Applications 204 or other suitable architecture components may utilize an I/O call to the pseudodevice through the OS 202 to obtain pointers to global queue manager 220 functions for managing constituent queues.

Optionally, some or all of the constituent work queues may be managed by constituent queue managers 222 operating in conjunction with the global queue manager 220. For example, a constituent queue manager 222 may be implemented by any suitable architecture component including an application 204, the OS 202, the file system 206 and/or may be a separate plug-in to the OS 202 or other system component. In some embodiments, a constituent work queue manager 222 manages aspects of a constituent work queue that do not require a global thread 308 including, for example, the adding of work items to the constituent work queue, determining whether some or all of the work items on the constituent work queue should be executed by a global thread, and managing a dedicated thread pool for the constituent work queue, if there is one.

Figure 5:
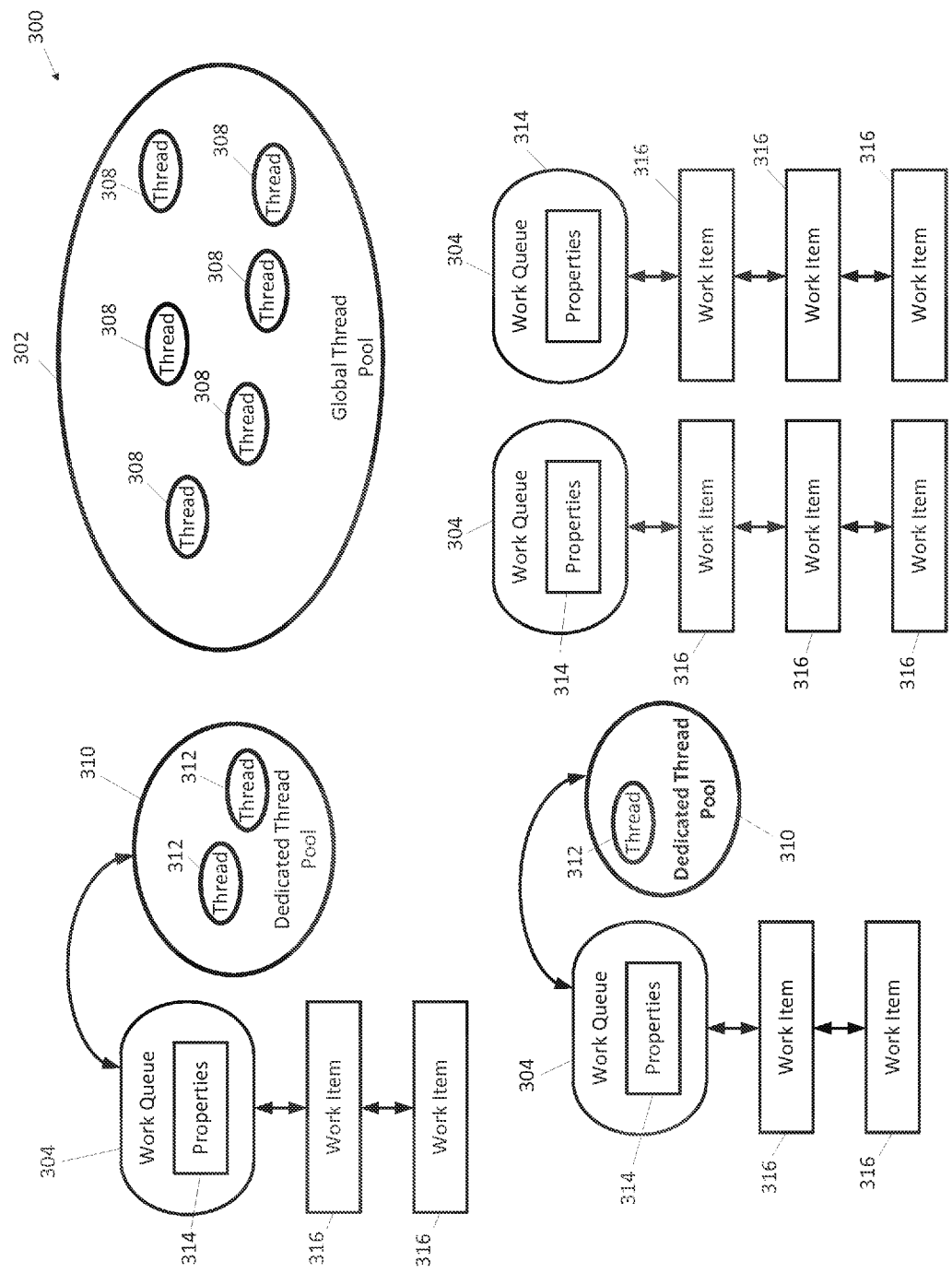
FIG. 5 is a diagram of one embodiment of an environment that may be implemented by the computer system of FIG. 1 to facilitate work queue thread balancing.

FIG. 5 is a diagram of one embodiment of an environment 300 that may be implemented by the computer system 100 to facilitate work queue thread balancing. The environment 300 comprises constituent work queues 304 and a global thread pool 302 comprising global threads 308. The constituent work queues 304 comprise work items 316 that are enqueued and awaiting execution. Each work item 316 enqueued at a work queue 304 may be represented by a pointer or other reference to computer program instructions that may be executed by a processor or processors of the computer system 100. Although all of the work queues 304 shown in FIG. 5 have pending work items 316, it is not necessary that every work queue 304 have pending work items 316 at all times. Some of the constituent work queues 304 comprise dedicated thread pools 310. The dedicated thread pools 310 comprise dedicated threads 312. Each dedicated thread 312 may execute only work items 316 from its corresponding work queue 304. Work items 316 from constituent work queues 304 with dedicated thread pools 310 may be executed by the dedicated threads 312 exclusively or by a combination of the dedicated threads 312 and the global threads 308, as described herein. Some of the constituent work queues 304, in contrast, may not have any dedicated threads. Work items 316 in these constituent work queues 304 may be executed exclusively by global threads 308.

Each work queue 304 may be described by a set of constituent work queue properties 314. The constituent work queue properties 314 may comprise general properties and thread properties. General properties describe the organization and operating of the constituent work queue 304 including, for example, whether the work queue 304 comprises a dedicated thread pool 310, a maximum and/or minimum number of dedicated threads 312, a maximum allowable queue depth, a maximum wait time for work items 316, a maximum idle time for dedicated threads, etc. The thread properties may be one or more properties that threads executing the work items 316 of the corresponding work queue 304 will have. Dedicated threads 312 may be generated with properties matching the thread properties of its corresponding work queue 304. A global thread 308, on the other hand, may be configured with the thread properties of whatever work queue 304 that the global thread 308 is currently servicing. For example, when a global thread 308 is matched to work item 316 of a work queue 304, the thread properties of that global thread 308 are modified to match the thread properties of the work queue 304.

The thread properties of a constituent work queue may include any suitable thread property or properties such as, for example, a process context, a security context, a priority, a processor affinity, a NUMA node affinity, interrupt priority, etc. Process context describes the context in which a process executes and may include, for example, a virtual address space, a cache state, etc. A virtual address space is a set of one or more virtual addresses that a thread uses to access system memory, such as RAM 210, cache 208, etc. Virtual addresses may not correspond to the physical addresses of memory locations. Instead, the OS 202 translates virtual addresses to corresponding physical addresses when the thread makes a read or write request. For example, the OS 202 may use a translation table to translate the virtual address received from the thread to a physical address at the system memory. The translation table, for example, is stored in cache memory 208 during execution of the process to allow the OS 202 to quickly decipher virtual addresses requested by the processor or its constituent threads. The cache state of a process describes at least a portion of the content of the cache memory 208. For example, the cache memory 208 may comprise data that is commonly read or written to by threads of the process.

The security context of a thread may generally describe the permissions of a thread executing in that security context. For example, different threads may have different levels of access to system resources, which may include other components of the architecture 200 and/or to external components available via a network adapter or other I/O device 212. The OS 202 may track the security context of a thread and respond to access requests accordingly. For example, the OS 202 may provide a thread with access to system resources only if the access complies with the thread's security context.

A priority of a thread is used, for example by the OS 202, to determine when the thread should execute. In some embodiments, the OS 202 assigns pending threads to the available processor cores based on priority. Higher priority threads are generally executed first and lower priority threads later. In some OSs, including versions of the MICROSOFT WINDOWS operating systems, the OS 202 assigns threads to available processor cores in round robin fashion based on priority. That is, all threads at the highest priority are assigned to processor cores, for example, in a first in first out (FIFO) manner. Once all threads at the highest priority are completed, then OS 202 may then execute all threads at the next highest priority level. If the OS 202 receives a request to execute a new thread having a higher priority than a currently executing thread, the OS 202 may halt the lower-priority thread, perform a context switch, and execute the new thread.

An interrupt priority of a thread, for example, may indicate the types of interrupts that the system 100 will accept while the thread is executing. Interrupt priority may handled using software or hardware or a combination of both. When interrupt priority is handled using software, the OS 202 or other suitable system software component may determine which types of interrupts are serviced while the thread is executing. When the interrupt priority is handled using hardware, the interrupt priority of the executing thread may be indicated on a register or other memory location. The hardware component may direct received interrupts to a particular processor core based on the priority of the threads executing at the respective processor cores. If all available processor cores are executing threads with a higher priority than a received interrupt, then processing of the interrupt may be deferred. For example, x64 platform processors available from AMD and INTEL have a register called a CR8 register. The CR8 register is a piece of dual port memory shared between the processor and the Input/Output Advanced Programmable Interrupt Controller (I/O APIC). When a thread begins execution, the OS 202 or other component may write an indication of the priority of the thread to the CR8 register. When an interrupt occurs on the peripheral side of the I/O APIC, it determines where to route the interrupt based on the shared state information at the CR8 register. The I/O APIC is configured to route the interrupt to a processor cores that is executing a thread having an interrupt priority lower than that of the received interrupt. If all available processor cores are executing higher priority threads, the received interrupt may remain pending until a processor core becomes available.

A processor affinity of a thread is an indication that the thread should be preferable or exclusively executed by a particular processor or processor core. For example, a thread may require system resources that are only available to the specific processor or processor core. In some embodiments, the thread may require system resources that are more easily or more quickly available to the specific processor or processor core (e.g. a portion of cache memory 208 or RAM 210). A processor affinity may be a requirement or a preference. For example, if the processor affinity is a requirement, then the OS 202 may execute the thread only at the indicated processor core. If the processor affinity is a preference, then the OS 202 may execute the thread on the preferred processor or processor core if available, but may not delay execution of the thread if the preferred processor is busy but another acceptable processor is available. A NUMA node affinity of a thread is similar to the processor affinity, but may refer to a particular NUMA node or properties of a particular NUMA node of the system 100. For example, more than one processor core may be part of the same NUMA node. NUMA node affinity, like processor affinity may be a requirement or a preference.

Figure 6:
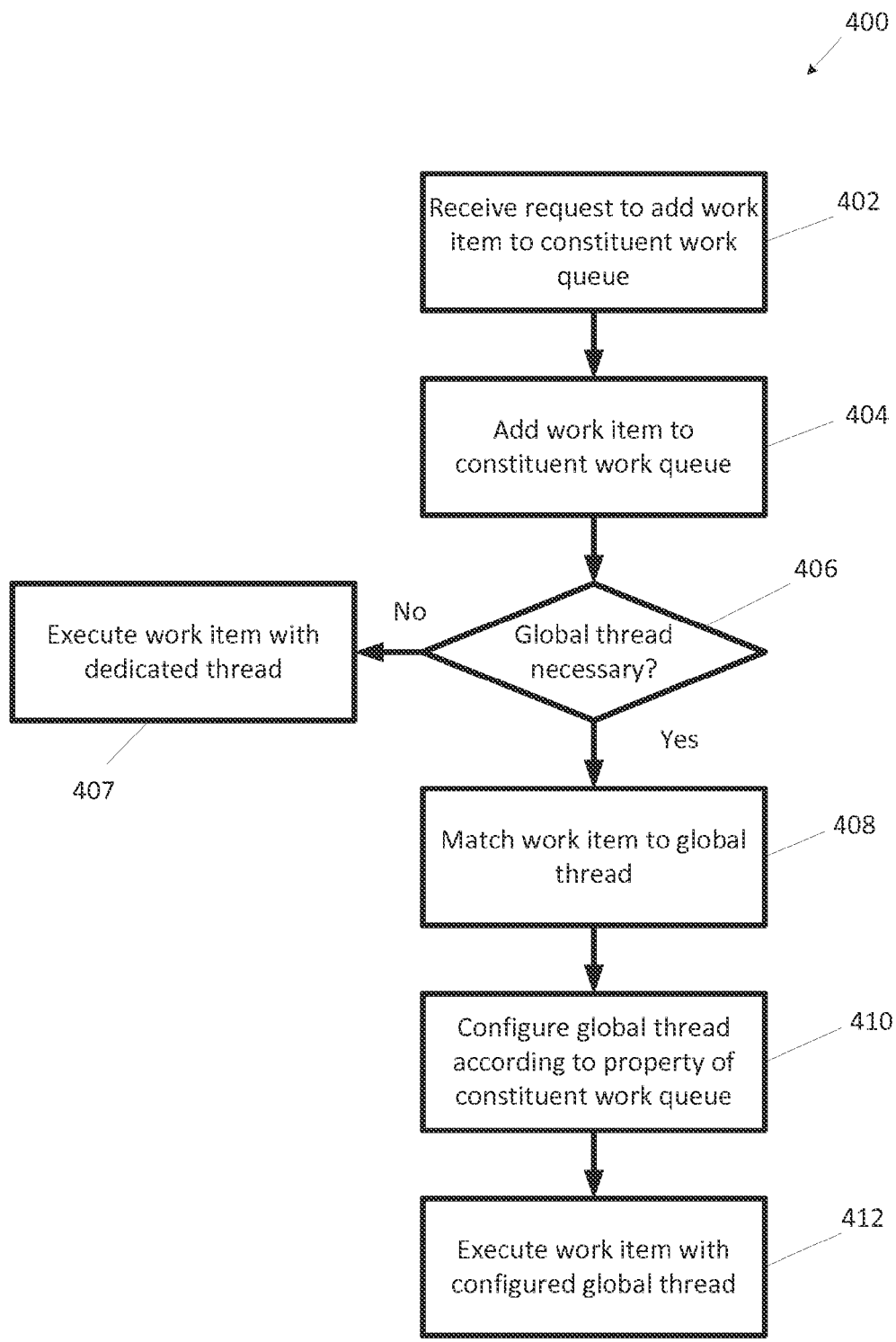
FIG. 6 is a flowchart showing one embodiment of a process flow for executing work items from constituent work queues with global threads.

The global queue manager 220 may manage the global thread pool 302, for example, by managing the execution of work items 316 with global threads 308 from the global thread pool 302. FIG. 6 is a flowchart showing one embodiment of a process flow 400 for executing work items 316 from constituent work queues 304 with global threads 308. The process flow 400 may be executed by the global queue manager 220, although it will be appreciated that some of the actions of the process flow 400 may be implemented by other components of the architectures 100, 200, for example, as described herein. At 402, the global queue manager 220 may receive a request to add a work item 316 to a constituent work queue 304. For example, an application 204 or other system component may direct the request to the global queue manager 220. The request may take the form of a function call that includes data necessary to execute the work item 316 such as, for example, an indication of the work item 316, an indication of the constituent work queue 304 to which the work item 316 is to be added, an indication of a system location containing computer program instructions for executing the work item 316 and data to be acted upon, etc.

Upon receiving the request, the global queue manager 220 may, at 404, add the work item 316 to the indicated constituent queue 304. Adding the work item 316 to the constituent queue 304 may comprise writing an entry to the queue 304 indicating the work item 316. For example the entry may comprise a pointer or other reference to the computer program instructions that are to be executed to accomplish the work item 316. In some embodiments, before writing the work item 316 to a constituent queue 304 with a dedicated thread pool 310, the global queue manager 220 may determine whether the additional dedicated threads 312 are needed to service the work item 316. For example, if the addition of the work item 316 will cause the queue 304 to fall out of compliance with its properties 314, then an additional dedicated thread or threads 312 may be initiated. For example, the additional work item 316 may cause the queue 304 to exceed its allowable depth and or wait time. If one or more additional threads are required, the global queue manager 220 may initiate the called-for thread or threads.

At 406, the global queue manager 220 may determine whether to execute the work item 316 with a global thread 308. This determination may be made according to any suitable criteria. For example, the global queue manager 220 may determine to execute a work item 316 with a global thread 308 when the constituent work queue 304 lacks dedicated threads 312. Also, for example, the global queue manager 220 may determine to execute the work item 316 with a global thread 308 when dedicated thread pool 310 for the work queue 304 does not include enough threads to execute the work item 316 in a timely manner and/or if the work queue 304 already comprises a maximum allowable number of dedicated threads 312. For example, if a threshold number of dedicated threads 312 in the dedicated thread pool 310 are in a wait state, the global queue manager 220 may determine to execute the work item 316 with a global thread 308. If the global queue manager 220 determines that the work item 316 is not to be executed by a global thread 308, then the work item 316 may be executed by a dedicated thread 312 at 407. For example, when the work item 316 reaches a front of the constituent queue 304, the next available dedicated thread 312 may take up the work item 316 and execute it.

If the global queue manager 220 determines that the work item 316 is to be executed by a global thread 308, then the global queue manager 220 may match the work item 316 to a global thread 308 at 408. The match may be performed in any suitable manner including, for example, as described herein below. At 410, the global queue manager 220 may configure the matched global thread 308 according to the thread properties 314 of the indicated constituent work queue 304. This may be performed in any suitable manner. For example, in MICROSOFT WINDOWS operating systems, the process and/or security context of the global thread 308 may be changed utilizing the KeStackAttachProcess function. Other thread properties such as priority, processor affinity, NUMA affinity, interrupt priority, etc. may be modified using other functions such as KeSetAffinityThread, KeSetSystemGroupAffinityThread, KeSetPriorityThread, KeSetBasePriorityThread, etc. Other types of operating systems may use another function or functions. For example, in some embodiments, the properties of a thread 308 may be modified by writing to a corresponding flag or indicator at a memory location associated with the thread 308. Once the global thread 308 has been configured according to the property set 314 of the constituent queue 304, the now configured global thread 308 may execute the work item 316 at 412.

Figure 7:
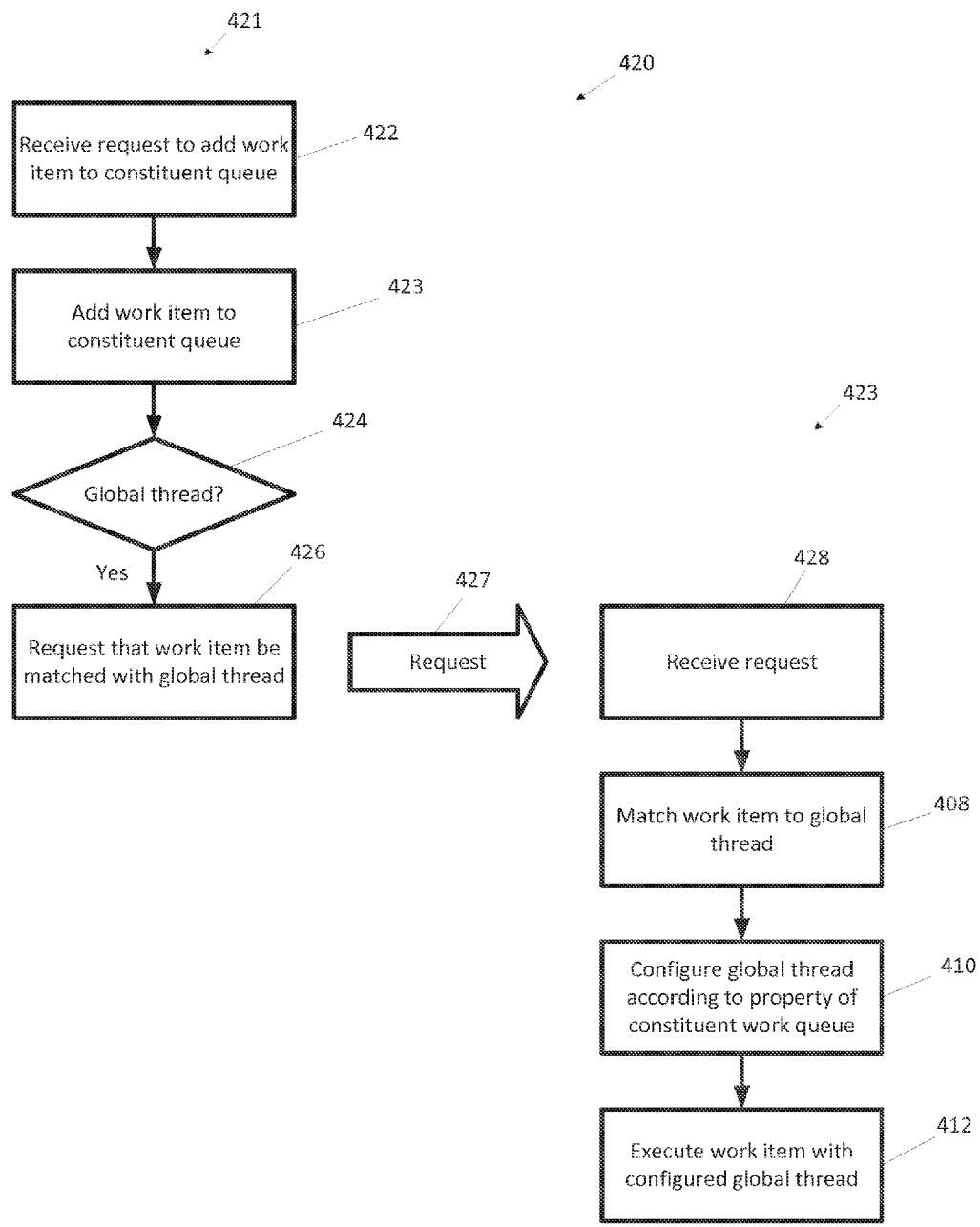
FIG. 7 is flow chart showing one embodiment of a process flow that may be executed by the global queue manager and a constituent queue manager to execute work items from a constituent work queue with global threads.

As described above, the global queue manager 220, in some embodiments, manages the constituent queues in conjunction with one or more constituent queue managers 222. FIG. 7 is flow chart showing one embodiment of a process flow 420 that may be executed by the global queue manager 220 and a constituent queue manager 222 to execute work items from a constituent work queue 304 with global threads 308. The constituent queue manager 222 may be and/or be a component of any other system component suitable for managing a constituent work queue such as, for example, an application 204, an operating system component, an operating system plug-in, etc. In the process flow 420, the column 421 comprises actions that may be performed by the constituent queue manager 222. The column 423 comprises actions that may be performed by the global queue manager 220.

At 422, the constituent queue manager 222 may receive a request to add a work item 316 to a constituent queue 304. In embodiments where the constituent queue manager 222 is executed by an application 204 or other component that is also the source of the work item 316, this action may be omitted. At 423, the constituent queue manager 222 may add the work item 316 to the constituent work queue 304, for example, in a manner similar to that described above with respect to 402. For example, in some embodiments, before writing the work item 316 to a constituent queue 304 with a dedicated thread pool 310, the constituent queue manager 222 may determine whether the additional dedicated threads 312 are needed to service the work item 316 and initiate any required additional dedicated threads 312.

At 424, the constituent queue manager 222 may determine if the work item 316 is to be executed by a global thread 308. If not, then the work item 316 may be executed by a dedicated thread 312 of the constituent work queue 304. If so, then the constituent queue manager 222 may, at 426, request that the work item 316 be matched with a global thread 308. The request 427 may include, for example, an indication of the constituent work queue 304 and an indication of the constituent work item 316. The global queue manager 220 receives the request 427 at 428. At 408, 410 and 412, the global queue manager 220 may match the item to a global thread 308, configure the global thread, and execute the work item 316, for example, in a manner similar to that described above with respect to the process flow 400.

Figure 8:
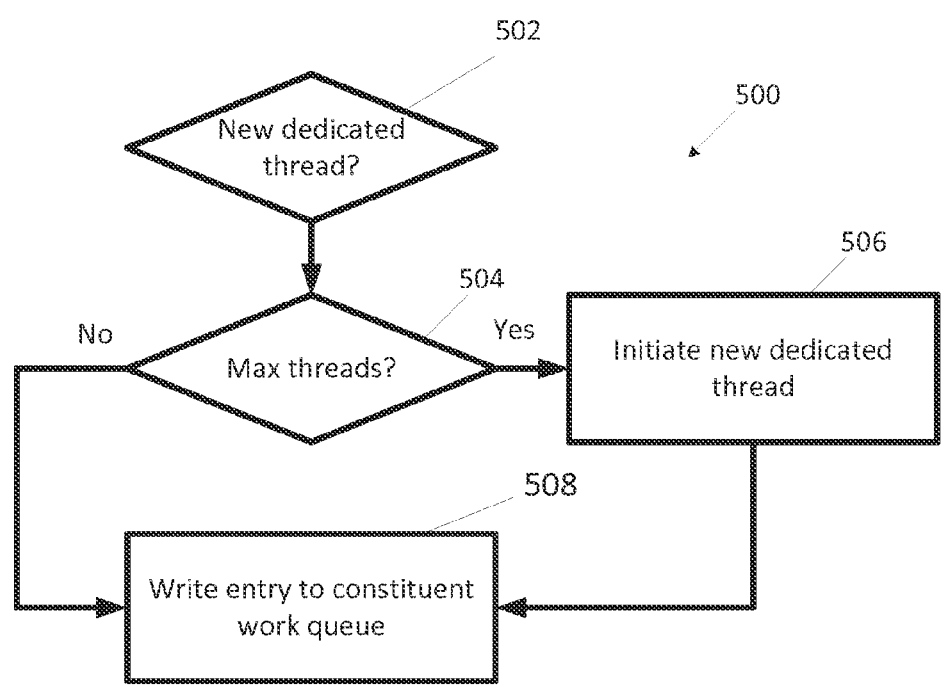
FIG. 8 is a flow chart showing one embodiment of a process flow for adding a work item to a constituent work queue comprising a dedicated thread pool.

FIG. 8 is a flow chart showing one embodiment of a process flow 500 for adding a work item 316 to a constituent work queue 304 comprising a dedicated thread pool 310. The process flow 500 is an example of how the global queue manager 220 and/or a constituent queue manager 222 may add a work item 316 to a constituent queue 304, as indicated at 404 and 423 above. The process flow 500 is described herein as being executed by the global queue manager 220, however, all or part of the process flow 500 may alternatively be performed by a constituent queue manager 222, for example, as indicated in the process flow 420.

At 502, the global queue manager 220 may determine whether adding the work item 316 will require the work queue 304 to include a new dedicated thread 312. This action may be omitted, for example, for constituent work queues 304 that lack dedicated thread pools 310. A new dedicated thread 312 may be required, for example, if the addition of the new work item 316 will cause the constituent work queue 304 to fall out of compliance with its constituent work queue properties 314 such as, for example, maximum wait time, maximum depth, etc. If a new dedicated thread is needed, the global queue manager 220 may determine, at 504, whether a new dedicated thread 312 is supported by the queue's properties 314. For example, if the constituent work queue 304 may already comprises a maximum allowable number of dedicated threads 312. If a new dedicated thread 312 is supported, then global queue manager 220 may initiate the new thread, at 506, and generate an entry for the work item 316 at the constituent work queue 304 at 508. If no new dedicated thread is required at 502, the global queue manager 220 may move from 502 to the creation of the queue entry at 508. Also, if no additional thread is supported at 504, the global queue manager 220 may move from 504 to the creation of the queue entry at 508.

Figure 9:
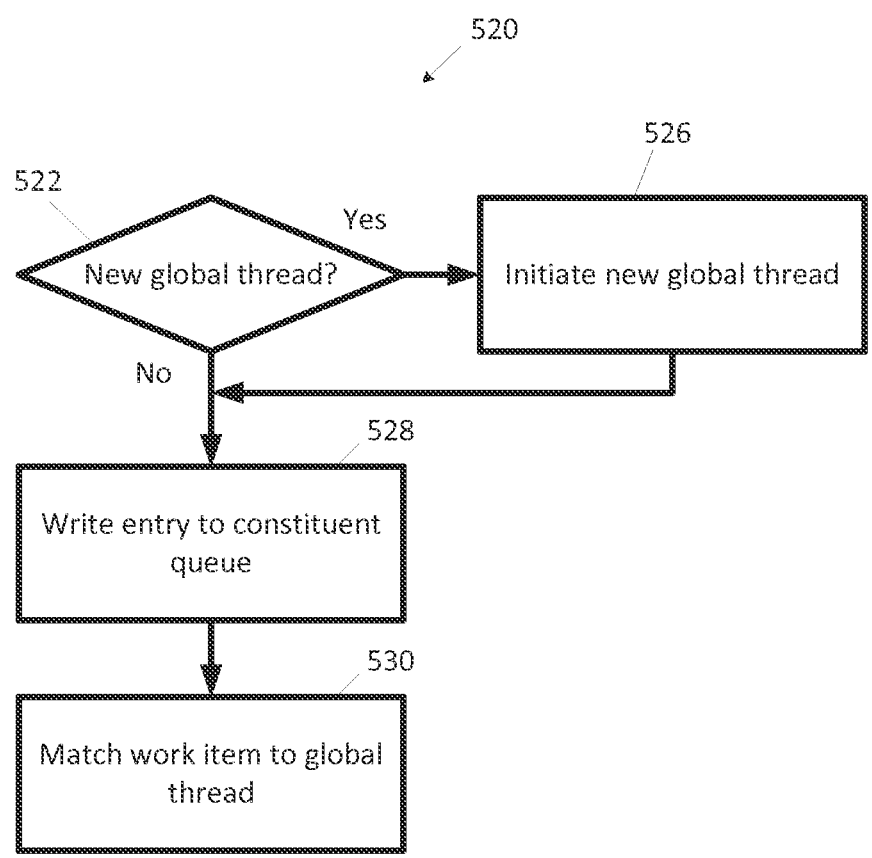
FIG. 9 is a flow chart showing one embodiment of a process flow for adding a work item to a constituent work queue that does not have a dedicated thread pool.

FIG. 9 is a flow chart showing one embodiment of a process flow 520 for adding a work item 316 to a constituent work queue 304 that does not have a dedicated thread pool 310. The process flow is another example of how the actions 403 and 423 may be executed by the global queue manager 220 and/or a constituent queue manager 222. Again, the process flow 520 is described herein as being executed by the global queue manager 220, however, all or part of the process flow 520 may alternatively be performed by a constituent queue manager 222, for example, as indicated in the process flow 420. At 522, the global queue manager 220 may determine whether an additional global thread 308 is required to service the new work item 316. An additional global thread 308 may be required, for example, if any of the constituent queues 304 exceed their respective maximum thread depths and/or wait times. If a new global thread 308 is needed, the global queue manager 220 may initiate it at 526. If no new global thread 308 is needed, the global queue manager 220 may write an entry for the work item 316 to the constituent work queue 304. At 530, the work item 316 may be matched with a global thread 308, for example, as described herein.

Figure 10:
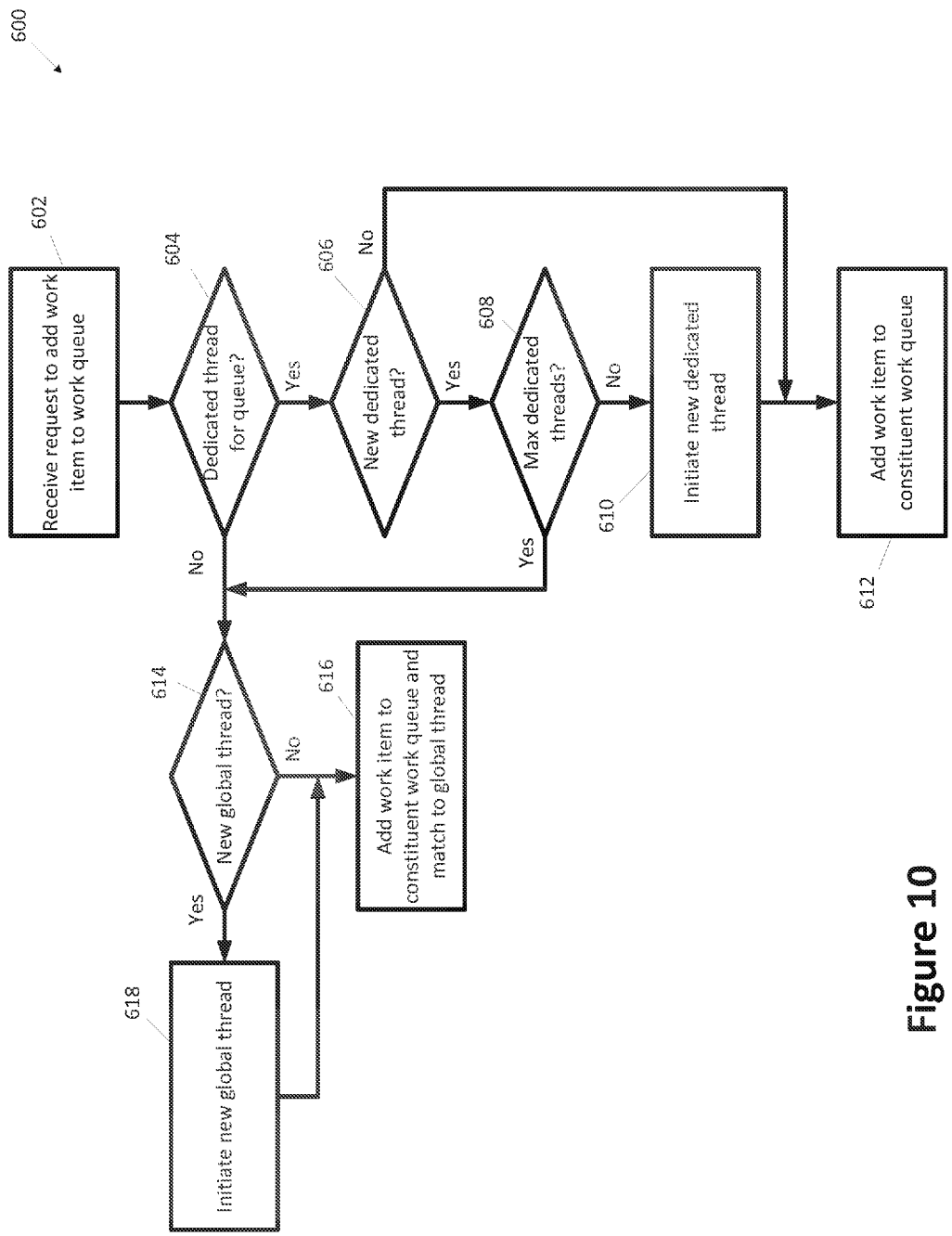
FIG. 10 is a flow chart showing one embodiment of a process flow that may be executed by the global queue manager to add a work item to a constituent work queue in the environment of FIG. 10 comprising a global queue.

FIG. 10 is a flow chart showing one embodiment of a process flow 600 that may be executed by the global queue manager 220 to add a work item 316 to a constituent work queue 304 in the environment 350 of FIG. 10 comprising a global queue 360. For example, the process flow 600 may be executed in embodiments where the global queue manager 220 provides management functions for the global thread pool 302 as well as the constituent work queues 304 and associated dedicated thread pools 310. At 602, the global queue manager 220 may receive a request to add a work item 316 to an identified constituent work queue 304. For example, the request may take the form of a function call to the global queue manager 220 from an application 204 or other component of the architecture 200 described herein above. The request may identify, for example, the constituent queue 304 to which the work item 316 is to be added and an indication of the work item 316. The indication of the work item 316 may be, for example, a pointer or other reference to computer program instructions for executing the work item 316 and data to be operated on by the work item, stored, for example, in memory 210, persistent storage 214, or at any other suitable location.

At 604, the global queue manager 220 may determine whether the identified constituent queue 304 has an associated dedicated thread pool 310. If not, the global queue manager may proceed to match the work item 316 with a global thread pool at 614, described below. If the constituent queue 304 does have a dedicated thread pool, then the global queue manager 220 may determine, at 606, whether the constituent work queue 304 can handle the work item 316 while maintaining its desired properties, e.g., queue depth, maximum work item wait time, etc. If no new thread is needed, the global queue manager 220 may add the work item 316 to the constituent work queue 304, for example, by adding an entry to the appropriate queue at 612. On the other hand, if a new thread is needed, the global queue manager 220 may determine, at 608, whether the constituent work queue 304 has reached a maximum number of dedicated threads 312 in its dedicated thread pool 310. If so, then the global queue manager 220 may move to 614, as described herein below. If not, then the global queue manager 220 may initiate a new dedicated thread 312 for the constituent work queue 304 at 610 and then add the work item 316 to the constituent work queue 304 at 612.

If the global queue manager 220 determines that the work item 316 is to be matched to a global thread 308, it may proceed to 614. For example, the global queue manager 220 may proceed to 614 if the constituent queue 304 lacks dedicated threads 312 (604) or if a new dedicated thread 312 is required, but the dedicated thread pool 310 already includes a maximum number of threads (608). At 614, the global thread manager 220 may determine whether the global thread pool 302 comprises sufficient global threads 308 to execute the work item 316. For example, the global thread manager 220 may determine whether the addition of the work item 316 will cause any of the constituent work queues 304 to exceed their maximum queue depth or maximum work item wait time. If a new thread is needed, the global thread manager 220 may initiate a new global thread 308 at 618. The work item 316 may, at 616, be added to the constituent work queue and matched to a global thread 308 in any suitable manner.

Figure 11:
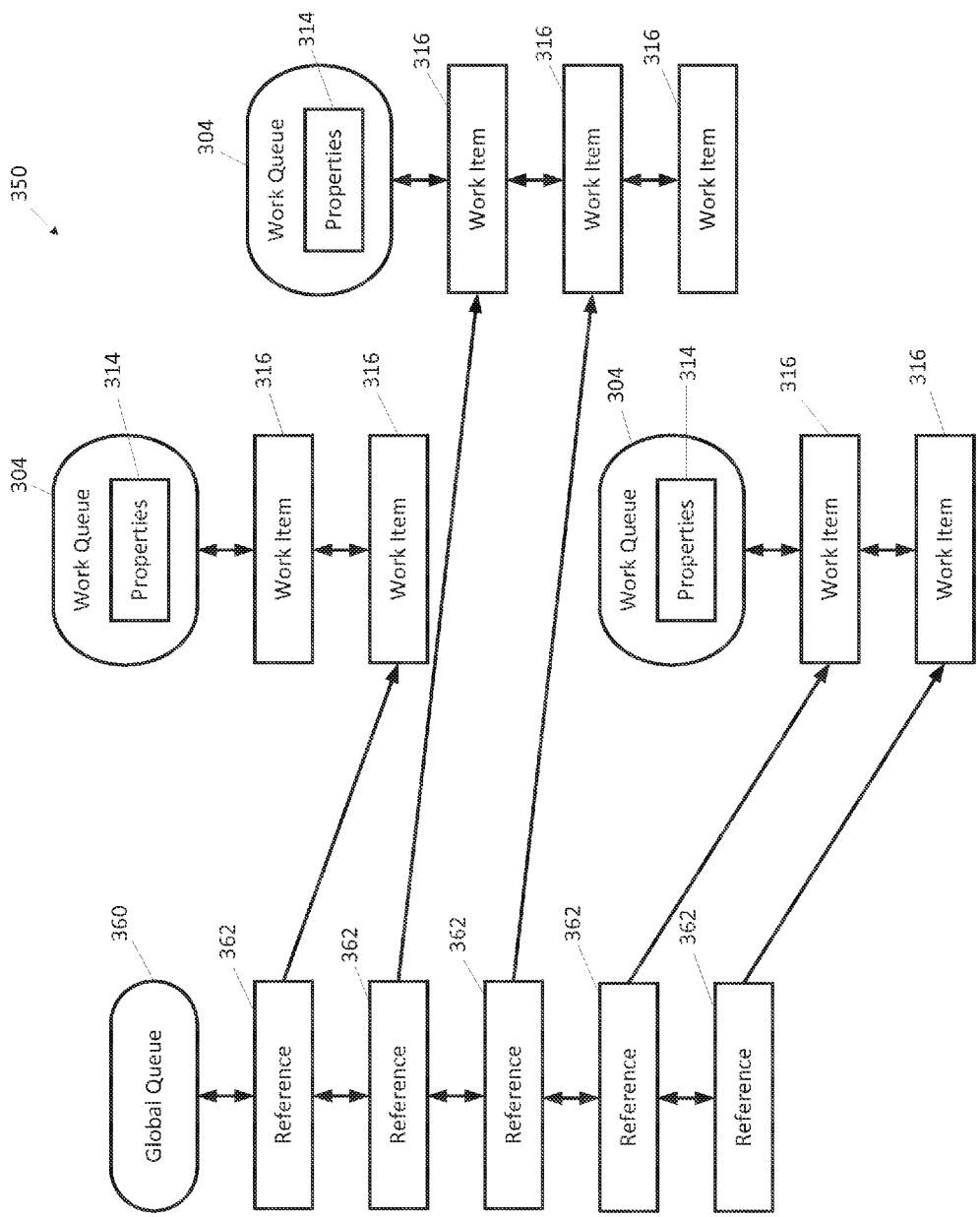
FIG. 11 is a diagram of one embodiment of an environment implemented by the computer system of FIG. 1 to match global threads to work items.

As described above, work items may be matched to global threads 308 in any suitable manner. Some embodiments utilize a global queue. FIG. 11 is a diagram of one embodiment of an environment 350 implemented by the computer system 100 to match global threads 308 to work items 316 using a global queue 360. In addition to the global queue 360, the environment 350 comprises constituent work queues 304, which may be either constituent work queues 304 with dedicated thread pools 310 or constituent queues 304 that rely on the global thread pool 302 (FIG. 5). The global queue 360 may comprise a set of global work queue entries 362. Each entry 362 may comprise a pointer or other reference that refers to an associated work item 316 from a constituent work queue 304. For example, the reference may refer back to the work item 316 as enqueued at a constituent queue 304 or may point directly to the computer program instructions for executing the work item 316.

Figure 12:
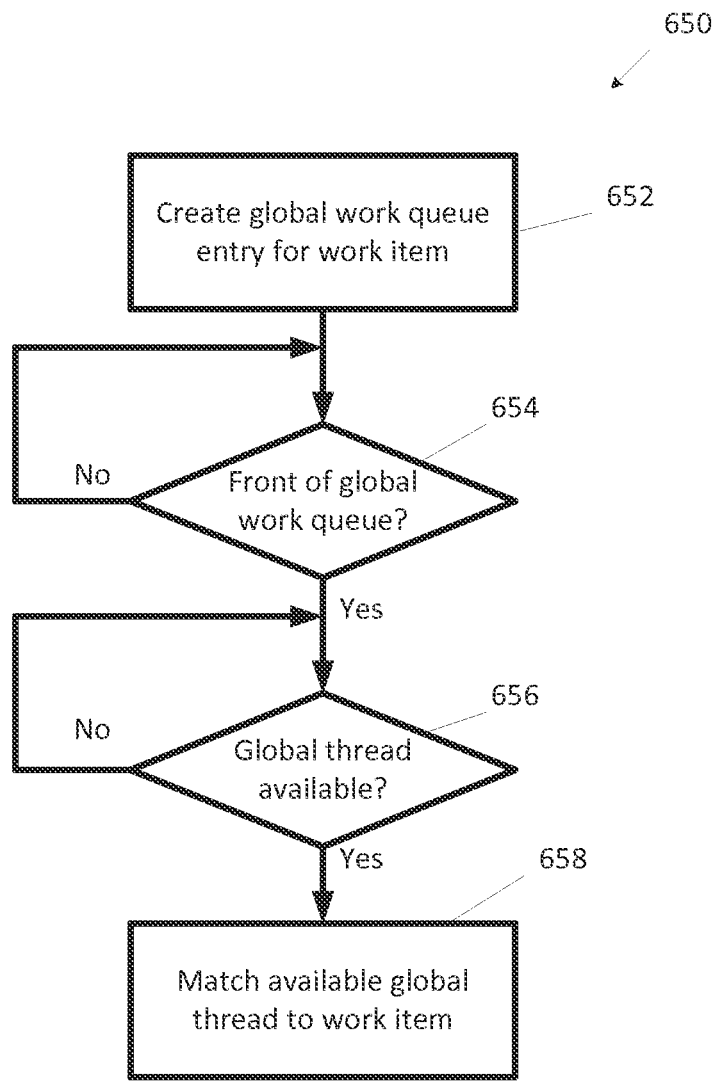
FIG. 12 is a flow chart showing one embodiment of a process flow for matching global threads to work items using a global queue.

FIG. 12 is a flow chart showing one embodiment of a process flow 650 for matching global threads 308 to work items 316 using a global queue 360. The process flow 650 may be executed, for example, by the global queue manager 620 upon determining that a work item 316 should be executed by a global thread 308. In some embodiments, the work item 316 may be added to the appropriate constituent work queue 304 prior to execution of the process flow 650. At 652, the global thread manager 220 may create a global work queue entry 362 for the work item 316 to be matched to a global thread 308. The global work queue entry 362 may refer to the work item 316 and/or the computer program instructions for executing the work item 316. In some embodiments, the global queue 360 may operate according to a first in first out (FIFO) method, where entries 362 that are first added the queue 360 are the first entries serviced by global threads 308 as they become available. Referring again to the process flow 650, when the entry 362 created at 652 reaches the front of the global queue at 654, the global queue manager 220 may determine whether any global threads 308 are available, at 656. When a global thread 308 is available, the global queue manager 220 may, at 658, match the available global thread 308 to the work item 316 referred to by the global queue entry 362. The global thread 308 may then be configured to the thread properties of the constituent queue 304 where the work item 316 was originally enqueued and then executed the work item 316, for example, as described herein above with respect to actions 410 and 412.

Figure 13:
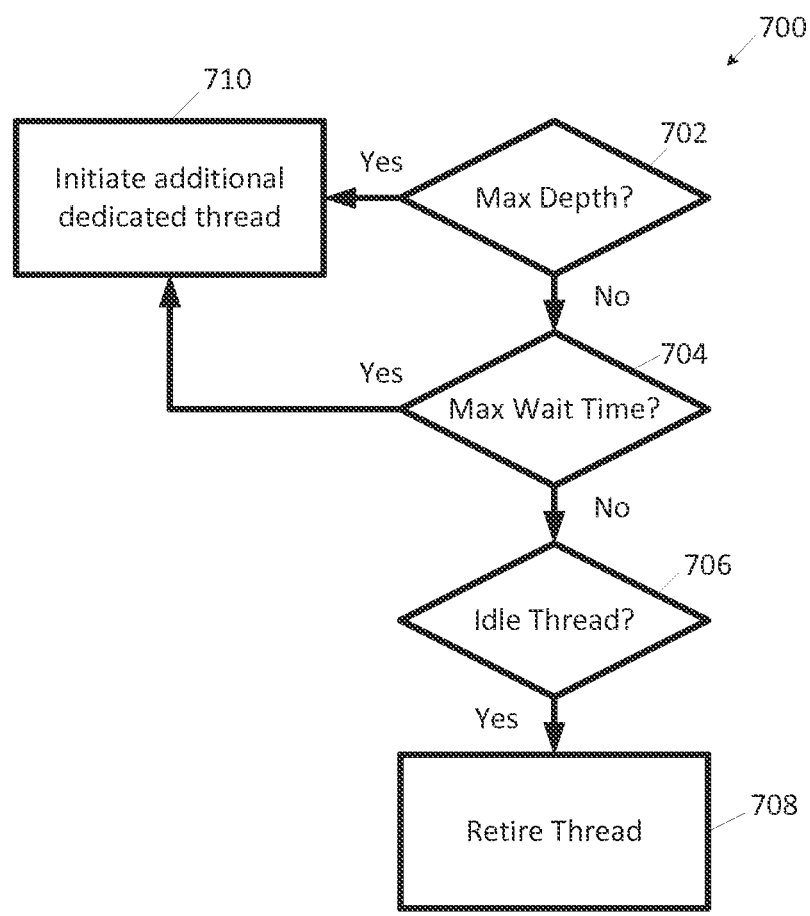
FIG. 13 is a flow chart showing one embodiment of a process flow for managing a constituent work queue comprising a dedicated thread pool.

In some embodiments, the global queue manager 220 and/or a constituent queue manager 222 may provide additional management of the constituent queues 304 and the various thread pools 310, 302. For example, FIG. 13 is a flow chart showing one embodiment of a process flow 700 for managing a constituent work queue 304 comprising a dedicated thread pool 310. The process flow 700 is described herein as being performed by the global queue manager 220. In some embodiments, however, some or all of the process flow 700 may be performed by a constituent queue manager 222 programmed to administer the constituent work queue 304. The process flow 700 may be performed at any suitable intervals or upon the occurrence of any suitable event. For example, the process flow 700 may be performed when a new work item 316 is added to the constituent work queue 304, when a work item 316 is deleted from the constituent work queue 304, etc. The process flow 700 may also be performed periodically.

At 702, the global queue manager 220 may determine if the queue meets or exceeds a maximum queue depth associated with the constituent work queue 304. If the maximum queue depth is exceeded, then the global queue manager 220 may initiate a new dedicated thread 312, at 704. At 706, the global queue manager 220 may determine if any work items 316 on the constituent work have been waiting for execution for more than a maximum wait time associated with the constituent work queue 304. If so, then the global queue manager 220 may initiate an additional dedicated thread 312 at 704. At 708, the global queue manager 220 may determine whether any dedicated threads 312 in the dedicated thread pool 310 have been idle for more than a maximum idle time.

The maximum idle time, for example, may be a property 314 of the work queue 304. If one or more dedicated threads 312 have been idle for more than the maximum idle time, then the global queue manager 220 may retire the threads at 710. Retiring a thread may comprise releasing memory containing properties of the thread as well as releasing any un-used memory allocated to the thread. In some embodiments, the maximum idle time may be zero. That is, if any idle threads 312 are found at 708, those threads 312 may be retired.

Figure 14:
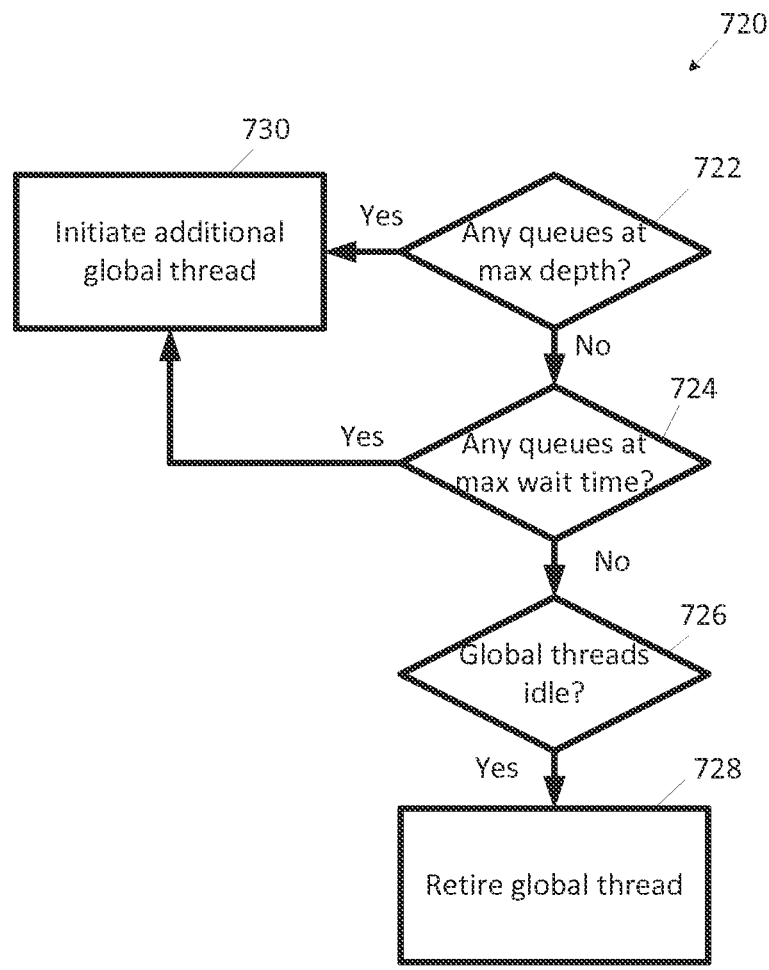
FIG. 14 is a flow chart showing one embodiment of a process flow that may be executed by the global queue manager to manage the global thread pool.

FIG. 14 is a flow chart showing one embodiment of a process flow 720 that may be executed by the global queue manager 220 to manage the global thread pool 302. The process flow 720 may be performed at any suitable intervals or upon the occurrence of any suitable event. For example, the process flow 720 may be performed when a new work item 316 is matched with a global thread 308. The process flow 720 may also be performed periodically. At 722, the global queue manager 220 may determine whether any constituent work queues 304 are at or above a maximum queue depth. There may be a single maximum queue depth applied to all of the constituent work queues 304 or queue-specific maximum queue depths may be used. If any queues 304 are at or above the maximum queue depth, the global queue manager 220 may initiate an additional global queue at 730. At 724, the global queue manager 220 may determine whether any of the constituent queues 304 have work items 316 that are at or exceed a maximum wait time. If so, the global queue manager 220 may initiate a new global thread 308 at 730. At 726, the global queue manager 220 may determine whether any of the global threads 308 in the global thread pool 302 are idle or have been idle for more than a threshold time. If so, the global thread or threads 308 that are idle or have been idle for more than the threshold time may be retired at 728.

As described herein, the global queue manager 220 may be configured to provide functions for performing various tasks related to work queue thread balancing. The functions may be callable by applications 204, work queue managers 222 or any other component of the architecture 200. In some embodiments, the global queue manager 220 provides a function for creating a constituent work queue 304. The request may comprise an indication of the properties 314 of the work queue including, for example, thread properties and general properties, as described herein. In response to the request, the global queue manager 220 may create the constituent work queue 304. For example, creating the constituent work queue 304 may comprise writing the properties 314 of the constituent work queue 304 to memory 210 and/or persistent storage 214 of the architecture 200 and creating a reference to the work queue 304 that may be used to make changes to the work queue 304 at a later time. For work queues 304 with a dedicated thread pool 310, creating the work queue 304 may also comprise initiating the thread pool 310. In some embodiments, a property 314 of the work queue 304 may indicate that the dedicated thread pool 310 is to include a minimum number of dedicated threads 312. In these embodiments, generating the work queue 304 may also comprise initiating the minimum number of dedicated threads.

In some embodiments, the global queue manager 220 may provide a function for modifying the properties 314 of an existing constituent work queue 304. For example, the global queue manager 220 may receive a request to modify the properties 314 of an existing work queue 304. The request may identify the constituent work queue 304 and the desired property changes. Any property 314 of the constituent work queue 304 may be modified including, for example, thread properties and general properties. Upon receiving the request, the global queue manager 220 may implement the requested changes. For example, the global queue manager 220 may write the new properties 314 to a location at memory 210 and/or persistent storage 214 associated with the constituent work queue 304. When the property change includes adding or deleting a dedicated thread pool 310, the global queue manager 220 may initiate and/or delete threads 312 and pools 310 as needed.

In some embodiments, the global queue manager 220 provides a function for adding work items to a constituent work queue 304. For example, the global queue manager 220 may receive a request to add a work item to a constituent work queue 304. The request may identify the constituent work queue 304 and the work item. For example, the work item may be identified by a reference to computer program code for executing the work item. The global queue manager 220 may add the work item to the requested constituent work queue 304 in any suitable manner including, for example, as indicated herein above with respect to FIGS. 6-10. Also, in some embodiments, the global queue manager 220 provides a function for removing or deleting a work item from a constituent work queue 304. The request may include an indication of the constituent work queue 304 and an identification of the work item. The global queue manager 220 may, for example, traverse the indicated work queue 304, identify an entry corresponding to the work item, and delete it.

The various process flows described herein in FIGS. 6-10 and 12-13 are illustrated with actions that may be performed by any suitable architecture component in any suitable order or combination. For example, in some embodiments, a global queue manager 220 may check for idle threads, and retire any idle threads as described at 726 and 728 above without also executing actions 722 and 724.

Although various embodiments are described herein in the context of a single computer system 100, the description of work queue thread balancing herein may also be applied across multiple computer systems in communication with one another over a network. For example, computer systems in communication with one another over a network may have dissimilar architectures. The global queue manager, then, could span multiple systems. In some embodiments, a work item may comprise a reference to an operation to be performed and a reference to the data on which it is to be performed. The operation and the data, for example, may be located at common or disparate computer systems on the computer network. In one example, the global queue manager would assign work from one computer system (e.g., an x86 Windows Server 2012R2 system) to a different system (e.g., an ARM Server running Unbuntu 14.2 Linux). In this way, work items and resources may be more evenly distributed across the participating systems in the network.

In various embodiments, modules or software can be used to practice certain aspects of the invention. For example, software-as-a-service (SaaS) models or application service provider (ASP) models may be employed as software application delivery models to communicate software applications to clients or other users. Such software applications can be downloaded through an Internet connection, for example, and operated either independently (e.g., downloaded to a laptop or desktop computer system) or through a third-party service provider (e.g., accessed through a third-party web site). In addition, cloud computing techniques may be employed in connection with various embodiments of the invention. In certain embodiments, a "module" may include software, firmware, hardware, or any reasonable combination thereof.

Various embodiments of the systems and methods may include and/or utilize a computer or computer system. In various embodiments, a computer may be in communication with a server or server system utilizing any suitable type of communication including, for example, wired or wireless digital communications. In some embodiments, the server or server system may be implemented as a cloud computing application and/or in a similar manner and may provide various functionality of the systems and methods as SaaS.

The examples presented herein are intended to illustrate potential and specific implementations of the present invention. It can be appreciated that the examples are intended primarily for purposes of illustration of the invention for those skilled in the art. No particular aspect or aspects of the examples are necessarily intended to limit the scope of the present invention.

It is to be understood that the figures and descriptions of the present invention have been simplified to illustrate elements that are relevant for a clear understanding of the present invention, while eliminating, for purposes of clarity, other elements. Those of ordinary skill in the art may recognize, however, that these sorts of focused discussions would not facilitate a better understanding of the present invention, and therefore, a more detailed description of such elements is not provided herein.

Any element expressed herein as a means for performing a specified function is intended to encompass any way of performing that function including, for example, a combination of elements that performs that function. Furthermore the invention, as may be defined by such means-plus-function claims, resides in the fact that the functionalities provided by the various recited means are combined and brought together in a manner as defined by the appended claims. Therefore, any means that can provide such functionalities may be considered equivalents to the means shown herein.

Moreover, the processes associated with the present embodiments may be executed by programmable equipment, such as computers. Software or other sets of instructions that may be employed to cause programmable equipment to execute the processes may be stored in any storage device, such as, for example, a computer system (non-volatile) memory, an optical disk, magnetic tape, or magnetic disk. Furthermore, some of the processes may be programmed when the computer system is manufactured or via a computer-readable memory medium.

It can also be appreciated that certain process aspects described herein may be performed using instructions stored on a computer-readable memory medium or media that direct a computer or computer system to perform process steps. A computer-readable medium may include, for example, memory devices such as diskettes, compact discs of both read-only and read/write varieties, optical disk drives, and hard disk drives. A computer-readable medium may also include memory storage that may be physical, virtual, permanent, temporary, semi-permanent and/or semi-temporary.

A "computer," "computer system," "component," "computer device," or "processor" may be, for example and without limitation, a processor, microcomputer, minicomputer, server, mainframe, laptop, personal data assistant (PDA), wireless e-mail device, cellular phone, pager, processor, fax machine, scanner, or any other programmable device configured to transmit and/or receive data over a network. Computer systems and computer-based devices disclosed herein may include memory for storing certain software applications used in obtaining, processing, and communicating information. It can be appreciated that such memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable memory media. In various embodiments, a "host," "engine," "loader," "filter," "platform," or "component" may include various computers or computer systems, or may include a reasonable combination of software, firmware, and/or hardware.

In various embodiments of the present invention, a single component may be replaced by multiple components, and multiple components may be replaced by a single component, to perform a given function or functions. Except where such substitution would not be operative to practice embodiments of the present invention, such substitution is within the scope of the present invention.

In general, it may be apparent to one of ordinary skill in the art that various embodiments described herein, or components or parts thereof, may be implemented in many different embodiments of software, firmware, and/or hardware, or modules thereof. The software code or specialized control hardware used to implement some of the present embodiments is not limiting of the present invention. For example, the embodiments described hereinabove may be implemented in computer software using any suitable computer programming language such as SQL, MySQL, or HTML using, for example, conventional or object-oriented techniques. Programming languages for computer software and other computer-implemented instructions may be translated into machine language by a compiler or an assembler before execution and/or may be translated directly at run time by an interpreter. Examples of assembly languages include ARM, MIPS, and x86; examples of high level languages include Ada, BASIC, C, C++, C#, COBOL, Fortran, Java, Lisp, Pascal, Object Pascal; and examples of scripting languages include SQL, MySQL, Bourne script, JavaScript, Python, Ruby, PHP, and Perl. Such software may be stored on any type of suitable computer-readable medium or media such as, for example, a magnetic medium, an optical storage medium, non-volatile random access memory (NVRAM), etc. Thus, the operation and behavior of the embodiments are described without specific reference to the actual software code or specialized hardware components. The absence of such specific references is feasible because it is clearly understood that artisans of ordinary skill would be able to design software and control hardware to implement the embodiments of the present invention based on the description herein with only a reasonable effort and without undue experimentation.

Various embodiments of the systems and methods described herein may employ one or more electronic computer networks to promote communication among different components, transfer data, or to share resources and information. Such computer networks can be classified according to the hardware and software technology that is used to interconnect the devices in the network, such as optical fiber, Ethernet, wireless LAN, HomePNA, power line communication or G.hn. The computer networks may also be embodied as one or more of the following types of networks: local area network (LAN); metropolitan area network (MAN); wide area network (WAN); virtual private network (VPN);

storage area network (SAN); or global area network (GAN), among other network varieties.

For example, a WAN computer network may cover a broad area by linking communications across metropolitan, regional, or national boundaries. As the systems and methods described herein aim to minimize I/O transactions, they may be useful in situations, such as cloud computing configurations, where I/O transactions are performed over a WAN or other network with long I/O delays. The network may use routers and/or public communication links. One type of data communication network may cover a relatively broad geographic area (e.g., city-to-city or country-to-country) which uses transmission facilities provided by common carriers, such as telephone service providers. In another example, a GAN computer network may support mobile communications across multiple wireless LANs or satellite networks. In another example, a VPN computer network may include links between nodes carried by open connections or virtual circuits in another network (e.g., the Internet) instead of by physical wires. The link-layer protocols of the VPN can be tunneled through the other network. One VPN application can promote secure communications through the Internet. The VPN can also be used to separately and securely conduct the traffic of different user communities over an underlying network. The VPN may provide users with the virtual experience of accessing the network through an IP address location other than the actual IP address which connects the access device to the network.

The computer network may be characterized based on functional relationships among the elements or components of the network, such as active networking, client-server, or peer-to-peer functional architecture. The computer network may be classified according to network topology, such as bus network, star network, ring network, mesh network, star-bus network, or hierarchical topology network, for example. The computer network may also be classified based on the method employed for data communication, such as digital and analog networks.

Embodiments of the methods, systems, and tools described herein may employ internetworking for connecting two or more distinct electronic computer networks or network segments through a common routing technology. The type of internetwork employed may depend on administration and/or participation in the internetwork. Non-limiting examples of internetworks include intranet, extranet, and Internet. Intranets and extranets may or may not have connections to the Internet. If connected to the Internet, the intranet or extranet may be protected with appropriate authentication technology or other security measures. As applied herein, an intranet can be a group of networks which employ Internet Protocol, web browsers and/or file transfer applications, under common control by an administrative entity. Such an administrative entity could restrict access to the intranet to only authorized users, for example, or another internal network of an organization or commercial entity. As applied herein, an extranet may include a network or internetwork generally limited to a primary organization or entity, but which also has limited connections to the networks of one or more other trusted organizations or entities (e.g., customers of an entity may be given access an intranet of the entity thereby creating an extranet).

Computer networks may include hardware elements to interconnect network nodes, such as network interface cards (NICs) or Ethernet cards, repeaters, bridges, hubs, switches, routers, and other like components. Such elements may be physically wired for communication and/or data connections and may be provided with microwave links (e.g., IEEE 802.12) or fiber optics, for example. A network card, network adapter or NIC can be designed to allow computers to communicate over the computer network by providing physical access to a network and an addressing system through the use of MAC addresses, for example. A repeater can be embodied as an electronic device that receives and retransmits a communicated signal at a boosted power level to allow the signal to cover a telecommunication distance with reduced degradation. A network bridge can be configured to connect multiple network segments at the data link layer of a computer network while learning which addresses can be reached through which specific ports of the network. In the network, the bridge may associate a port with an address and then send traffic for that address only to that port. In various embodiments, local bridges may be employed to directly connect local area networks (LANs); remote bridges can be used to create a wide area network (WAN) link between LANs; and/or, wireless bridges can be used to connect LANs and/or to connect remote stations to LANs.

In various embodiments, a hub may be employed which contains multiple ports. For example, when a data packet arrives at one port of a hub, the packet can be copied unmodified to all ports of the hub for transmission. A network switch or other devices that forward and filter OSI layer 2 datagrams between ports based on MAC addresses in data packets can also be used. A switch can possess multiple ports, such that most of the network is connected directly to the switch, or another switch that is, in turn, connected to a switch. The term "switch" can also include routers and bridges, as well as other devices that distribute data traffic by application content (e.g., a Web URL identifier or other data location information as described herein). Switches may operate at one or more OSI model layers, including physical, data link, network, or transport (i.e., end-to-end). A device that operates simultaneously at more than one of these layers can be considered a multilayer switch. In certain embodiments, routers or other like networking devices may be used to forward data packets between networks using headers and forwarding tables to determine an optimum path through which to transmit the packets.

In various embodiments, the computer systems, data storage media, or modules described herein may be configured and/or programmed to include one or more of the above-described electronic, computer-based elements and components, or computer architecture. In addition, these elements and components may be particularly configured to execute the various rules, algorithms, programs, processes, and method steps described herein.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

While various embodiments have been described herein, it should be apparent, however, that various modifications, alterations and adaptations to those embodiments may occur to persons skilled in the art with the attainment of some or all of the advantages of the invention. The disclosed embodiments are therefore intended to include all such modifications, alterations and adaptations without departing from the scope and spirit of the invention.

I claim:

1. A computer-implemented system comprising:
at least one processor; and
a data storage operatively associated with the at least one processor, wherein the at least one processor is programmed to execute a global queue manager, wherein the global queue manager is configured to:
receive a request to add a first work item to a constituent work queue, wherein the constituent work queue is described by a plurality of work queue thread properties;
write an entry for the first work item to the constituent work queue, wherein the entry for the first work item comprises a reference to first computer program instructions for executing the first work item;
determine that a dedicated thread from a dedicated thread pool of the constituent work queue is available to execute the first work item, wherein the dedicated thread is configured to logically link to the constituent work queue and to exclusively execute a work item added to the constituent work queue;
execute the first work item with the dedicated thread, wherein thread properties of the dedicated thread match at least a portion of the thread properties of the work queue;
receive a request to add a second work item to the constituent work queue;
write an entry for the second work item to the constituent work queue, wherein the entry for the second work item comprises a reference to second computer program instructions for executing the second work item;
determine that a dedicated thread is not available to execute the second work item;
add the second work item to a global queue;
determine that the second work item has reached a front of the global queue;
determine that a global thread is available;
configure the global thread according to the plurality of work queue thread properties to generate a configured global thread; and
execute the second work item with the configured global thread.

2. The system of claim 1, wherein executing the second work item with the configured global thread comprises executing the second computer program instructions for executing the second work item by the configured global thread.

3. The system of claim 1, wherein the global queue manager is also configured to:
receive a request to create the constituent work queue, wherein the request comprises an indication of a plurality of work queue properties for the constituent work queue; and
initiate the constituent work queue.

4. The system of claim 3, wherein the plurality of work queue properties includes an indication that the constituent work queue is to comprise the dedicated thread pool, and wherein initiating the constituent work queue comprises initiating at least one dedicated thread.

5. A computer-implemented system for work queue thread balancing comprising:
at least one processor; and
a data storage operatively associated with the at least one processor, wherein the at least one processor is programmed to execute a constituent queue manager and a global queue manager, wherein the constituent queue manager is programmed to:
receive a request to add a first work item to a constituent work queue, wherein the constituent work queue is described by a work queue thread property;
determine that it is necessary to initiate a dedicated thread selected from a dedicated thread pool of the constituent work queue;
initiate a dedicated thread;
add the first work item to the constituent work queue;
execute the first work item with the dedicated thread;
receive a request to add a second work item to the constituent work queue;
add the second work item to the constituent work queue;
request that a global queue manager match the second work item to a global thread selected from a global thread pool;
configure, by the global queue manager, the global thread according to the work queue thread property to generate a configured global thread; and
execute the second work item with the configured global thread.

6. The system of claim 5, wherein the work queue thread property comprises a process context.

7. The system of claim 5, wherein adding the second work item to the constituent work queue comprises creating a constituent work queue entry corresponding to the second work item at the constituent work queue.

8. The system of claim 7, wherein matching the second work item to the global thread comprises:
creating a global work queue entry corresponding to the second work item at a global work queue, wherein the global work queue entry comprises a reference to the second work item and a reference to the constituent work queue;
determine that the global work queue entry has reached a front of the global work queue;
determine that the global thread is available to take on a work item; and
assign the global thread to the work item.

9. The system of claim 8, wherein the reference to the constituent work queue comprises a reference to the constituent work queue entry.

10. The system of claim 5, wherein the at least one processor is further programmed to:
before matching the second work item to the global thread, determine that at least one dedicated thread for the constituent work queue is in a wait state.

11. A computer-implemented system comprising:
at least one processor; and
a data storage operatively associated with the at least one processor, wherein the at least one processor is programmed to execute a global queue manager, wherein the global queue manager is configured to:
receive a request to execute a first work item from a constituent work queue selected from a plurality of constituent work queues, wherein the constituent work queue is described by a plurality of work queue thread properties;
match the first work item to a dedicated thread selected from a dedicated thread pool of the constituent work queue, wherein the dedicated thread is configured to logically link to the constituent work queue and to exclusively execute a work item added to the constituent work queue;

instruct the dedicated thread to execute the first work item, wherein thread properties of the dedicated thread match at least a portion of the thread properties of the work queue;

receive a request to execute a second work item from the constituent work queue;

write an entry for the second work item to a global queue, wherein the entry for the second work item comprises a reference to second computer program instructions to execute the second work item and a reference to the constituent work queue;

determine that the second work item has reached a front of the global queue;

determine that a global thread is available;

match the second work item to a global thread selected from a global thread pool wherein the global thread pool comprises a plurality of global threads;

configure the global thread according to at least one work queue thread property of the constituent work queue to generate a configured global thread; and instruct the configured global thread to execute the second work item.

12. The system of claim 11, wherein the global queue manager is also configured to:

receive a request to execute a third work item from a second constituent work queue selected from the plurality of constituent work queues;

match the third work item to a second global thread selected from the global thread pool;

configure the second global thread according to at least one property of the second constituent work queue to generate a second configured global thread; and instruct the configured global thread to execute the third work item.

13. The system of claim 11, wherein the global queue manager is also configured to:

determine, based on at least a portion of the plurality of constituent work queues, to initiate an additional global thread; and initiate the additional global thread.

14. The system of claim 13, wherein determining to initiate an additional global thread comprises at least one action selected from the group consisting of:

determining whether any of the plurality of constituent work queues has a queue depth greater than a queue depth threshold for the constituent work queue; and determining whether any of the plurality of constituent work queues has a queue wait time greater than a queue wait time for the constituent work queue.

15. The system of claim 11, wherein the global queue manager is also configured to:

determine, based on a state of at the global thread pool, to reduce a size of the global thread pool; and terminate at least one global thread selected from the plurality of global threads.

16. The system of claim 15, wherein determining to reduce the size of the global thread pool comprises determining whether any of the plurality of global threads has been idle for greater than a threshold idle time.

17. The system of claim 11, wherein the global queue manager is a component of an operating system of the system.

18. The system of claim 11, wherein the global queue manager executes as an operating system plug-in that executes in a kernel address space of the system.

* * * * *